March 2, 1965  L. O. BROWN  3,171,457
CARCASS SAW BLADE
Filed June 20, 1962
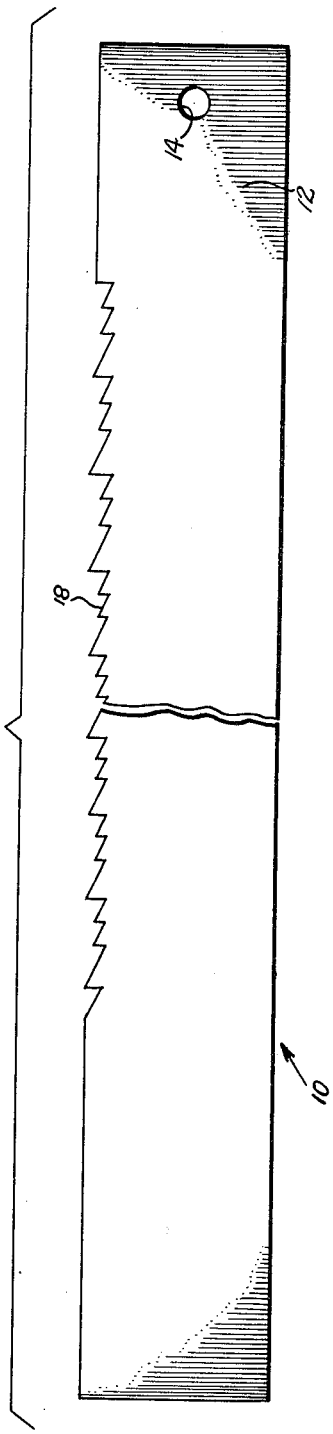
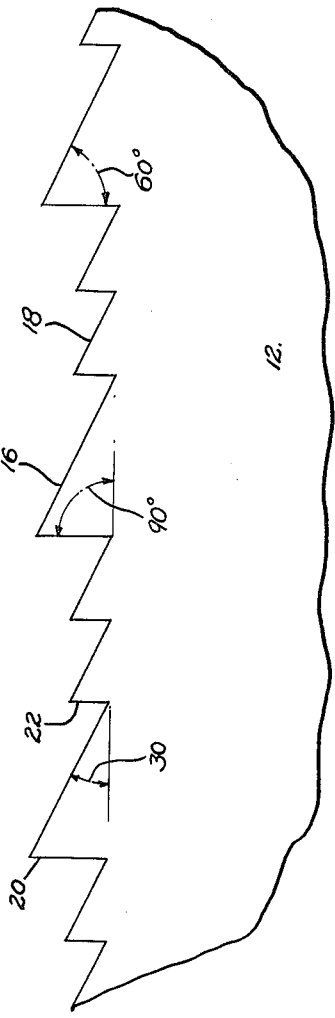
INVENTOR.
Lark O. Brown

United States Patent Office 3,171,457
Patented Mar. 2, 1965

3,171,457
CARCASS SAW BLADE
Lark O. Brown, 165 Salem Heights Ave. SE., Salem, Oreg.
Filed June 20, 1962, Ser. No. 203,994
2 Claims. (Cl. 143—129)

The present invention generally relates to a carcass saw and more particularly to a saw blade of novel construction for efficiently coping with the peculiar structure which it encounters when splitting animal carcasses.

The back-bone of an animal consists of a vertebra (bone) separated by pads of highly resilient tissue, through both of which the saw blade must cut. With the V-type or beveled toothed blades in common use, it is necessary for the operator to maintain a heavy continous pressure on the saw in the direction of its cut during its use because the springy tissues clog the small gullets of the saw blade and tend to force the points of the teeth away from the bone. The larger openings between the points of the large teeth on the present saw blade permits the expansion of the pad tissues when the natural pressure upon it is relieved by the cutting of the vertebrae. This tissue is caught and removed by the small teeth.

A very important object of the present invention is to provide a carcass saw blade in which the saw teeth do not have any set whatsoever. One of the reasons for this is that as the carcass is split, it has a tendency to pull away from the saw blade thus allowing the blade to run free and to cut evenly without undue pressure being exerted thereon.

This saw blade is primarily for electric powered reciprocating carcass saw not limited to an electrical powered saw only, since the blade may be adapted for use on any manner of power-operated saw using a reciprocating motion of the saw blade.

The saw blade of the present invention is cleaner in operation due to all the cutting motion being in the direction away from the operator, safer in operation because of cutting away from the operator, faster in operation because it operates continuously without clogging, requires less pressure on the blade to facilitate its cuttings, eliminates generating of heat in the blade and creates longer blade life.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of the saw blade of the present invention;

FIGURE 2 is an edge view of a portion of the saw blade illustrating the absence of set in the teeth; and FIGURE 3 is an enlarged fragmentary elevational view of several groups of teeth illustrating the relationship of the teeth.

Referring now specifically to the drawings, the carcass saw blade of the present invention is designated generally by reference numeral 10. This saw blade 10 consists of a suitable saw steel blade 12 of a thickness approximately one-sixteenth inch by two inches in width. This width and the length may be variable to conform to the type and size of machine used. The blade 12 has suitable bolt holes 14 positioned at one or both ends of the blade to accommodate the bolts which will fasten it to the saw. Along one edge of the blade is formed a continuous series of large and small teeth, each series consisting of one large tooth and two small teeth 16 and 18, respectively, and so sized that there are one and one-half large teeth per inch along the blade. The depth of the gullet of the large tooth is three-sixteenths inch, and of the small teeth three thirty-seconds inch, the small teeth 18 thus being three thirty-seconds shorter than the large teeth 16. All teeth are similarly formed, differing only in size. The leading edges 20 and 22 of the teeth are ninety degrees to the horizontal axis of the saw. The back of each tooth is inclined thirty degrees from the horizontal axis of the saw, forming, at its intersection with the lead forward edge of the tooth an included angle of sixty degrees. The teeth are not set since none is required, thus a minimum of material is removed and prevents clogging and over heating. A certain amount of each end of the blade is left without teeth, that part serving as a guide and/or point of attachment to the machine, and this amount depends upon the requirements of the machine, with which it is to be used. The cutting edges of all teeth are squarely cut across the thickness of the blade without slant or slope diagonal to the flat surface of the blade, as shown in FIGURE 2 of the drawing. This is essential to the efficient operation of the sawblade.

The dimensions set forth in detail are not to be construed as limiting the saw blade to one particular size. Rather, the dimensions are only illustrative of an acceptable size and set forth the desirable proportions and characteristics of the saw blade.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications equivalents may be resorted to, falling within the scope of the invention as claimed.

What is claimed as new is as follows:

1. A carcass saw blade comprising an elongated blade of saw steel having parallel side surfaces from the back edge to the cutting edge, means formed on said blade for connection with an operator, and a plurality of saw teeth arranged along the cutting edge of said blade, said teeth having parallel side surfaces forming continuations of the side surfaces of the blade and including a series of groups with each group containing two small teeth and one large tooth, said large teeth having a height substantially equal to twice the height of the small teeth, said blade having a constant thickness throughout its area; the juncture between the leading edge and trailing edge of each tooth forming a transverse edge in perpendicular relation to the side surfaces of the saw blade.

2. The saw blade as defined in claim 1 wherein a portion of said blade at each end thereof is solid and aligned with the apices of the large teeth for forming a guide for the blade, each of said teeth having a leading edge disposed in perpendicular relation to the longitudinal axis of the saw blade.

References Cited by the Examiner
UNITED STATES PATENTS

| | | | |
|---|---|---|---|
| 105,261 | 7/70 | Shailer | 143—133 |
| 349,143 | 9/86 | Clemson | 143—133 |
| 655,059 | 7/00 | Caruthers. | |
| 850,292 | 4/07 | Butler. | |
| 1,246,905 | 11/17 | Garlock et al. | |
| 1,497,577 | 6/24 | Morzsa | 125—38 XR |
| 2,734,533 | 2/56 | Roberts | 146—88 |

FOREIGN PATENTS 1,120,128    4/56    France.

J. SPENCER OVERHOLSER, *Primary Examiner.*